Sept. 30, 1958 S. LUBKIN 2,854,653

ERROR DETECTION SYSTEM

Filed Oct. 21, 1955 2 Sheets-Sheet 1

INVENTOR.
SAMUEL LUBKIN
BY S.C. Yuter
ATTORNEY

ERROR DETECTOR 8

INVENTOR.
SAMUEL LUBKIN
BY S.C. Yuter
ATTORNEY

United States Patent Office 2,854,653

Patented Sept. 30, 1958

2,854,653

ERROR DETECTION SYSTEM

Samuel Lubkin, Bayside, N. Y., assignor to Underwood Corporation, New York, N. Y., a corporation of New York Application October 21, 1955, Serial No. 542,051

13 Claims. (Cl. 340—173)

This invention relates to information handling systems and more particularly to apparatus for detecting errors in the transfer of information represented by signals in information handling systems.

In many information handling systems such as data processors the data is usually represented in binary form. The presence or absence of a signal is used to designate a unit of information called a binary digit or bit. By suitably coding combinations of the bits, decimal digits and alphabetic characters can be represented.

Thus any number or word can be represented by a group of signals. In particular, the binary system of notation is highly suited for pulse signal representation where the presence of a pulse signal indicates a one and and the absence of a pulse signal indicates a zero.

In data processors of this type the data is usually coded into binary notation and handled by the data processors as distributions of pulse signals. The pulse signals representing the information are sequentially switched to the various units of the data processor for different processing operations. For example, the information may first be processed by an arithmetic unit, then transferred to a storage unit and later extracted from the storage unit to be the operand in another arithmetic operation.

During the switching and transferring operations, there is the possibility of losing or gaining one or more of the pulse signals so that the distribution of pulse signals no longer correctly represents the desired information. If the changing of the information by the loss or gain of a pulse signal is undetected and the succeeding operations are permitted to proceed, the results of the data processing operation will be erroneous. In many applications and in particular magnetic tape storage devices, it has been found that most errors occur due to the loss of pulse signals. Thus, it is highly desirable to be able to check errors occurring due to the loss of pulse signals.

In order to prevent the occurrence of undetected errors various error detecting systems have been devised. Most of the common error detecting systems usually employ pulse signal counting. For example, a common error detecting system is called the "odd-even" check. The information being handled is divided into groups of bits. In a particular example, four binary digits can represent a decimal digit and the four binary digits form the basis for a group of bits. As each decimal digit (four binary digits) is transferred to the storage unit, the number of pulse signals in the group are counted. If the count is even (0, 2 or 4) a pulse signal is transferred with the group so that the total number of pulse signals in a five-bit group (the four representing the decimal digit and the one check bit) is odd. If the count were odd (1 or 3) then no check-pulse signal is transmitted with the group and the number of pulse signals in the five-bit group is also odd.

During transfer from the storage unit the pulse signals in each five-bit group are counted. A test is performed to determine whether the count of the pulse signals in each group is odd. If the count of the pulse signals in any group is even, a pulse signal has been lost in that group indicating that an error exists.

Unfortunately, it is possible to lose two pulse signals and not detect an error since the loss of two pulse signals in an odd number of pulse signals leaves an odd number of pulse signals. Thus, the error arising from the loss of the second pulse signal masks the error arising from the loss of the first pulse signal. It should be noted that the system is equally susceptible to the gain of compensating pulse signals.

In an effort to improve the detection of lost or gained pulse signals, a second system is often employed which also involves pulse signal counting. During the transfer of a specified block of information to a storage unit a count is made of the number of pulse signals present in the block of information. The count as a binary coded number represented by pulse signals is also stored.

When the block of information is transferred from the storage unit the pulse signals are again counted. The second count number is compared with the first stored count number. If no pulse signals have been lost or gained, both count numbers are identical. If the count numbers differ then it is highly probable that a pulse signal has been lost or gained.

Although such an error checking system performs satisfactorily to indicate the loss or gain of pulse signals by detecting changing pulse signal counts, it suffers from one limitation. It cannot detect the self-compensating error due to the loss of pulse signals in the block of information accompanied by the loss of particular pulse signals in the stored count number.

As an example, assume that the count number is stored as a binary number. If in a block of information being transferred seven pulse signals are present the binary representation of the count number to be stored is 0111. If one of the pulse signals in the block of information is lost only six pulse signals will be counted when the information is transferred from the storage unit. If in the pulse signal pattern representing the count number the binary digit of the least significant order is also lost, then the binary representation of the count number becomes 0110 which represents the number six. Hence, since both numbers are identical, no error can be detected.

The error created by the loss of an information pulse signal has been compensated by the loss of a particular pulse signal in the binary representation of the count number.

It is therefore an object of the invention to provide an improved error detector for detecting errors which occur due to the loss of pulse signals in transferred information.

It is another object of the invention to provide an improved error detector employing pulse-signal counting techniques.

It is a further object of the invention to provide an improved pulse signal counting error detector in which the count number is stored.

It is a still further object of the invention to provide a pulse signal counting error detector that cannot generate compensating errors due to loss of pulse signals.

In accordance with the invention error-detecting apparatus is provided for counting the number of pulse signals present in a block of information being transferred to a data storage unit. The count number representing the count of the transferred pulse signals is converted to a first numerical indicator. The functional relationship between the count number and the first numerical indicator is such that the greater the count number the smaller the first numerical indicator. The first numerical indicator is also stored. When the block of information is transferred from the storage unit the pulse signals in the block are again counted yielding a second count number and a second numerical indicator. A test for a predetermined relationship between the first and second numerical indicators is performed. If the relationship exists no error has occurred, and if the relationship does not exist then an error is indicated.

In accordance with another and more general embodiment of the invention, an error-detecting system is provided in which the numerical indicator is both a function of the number of pulse signals present as well as the relative position of the pulse signals in the information. The numerical indicator can have any relationship to the number and position of the information pulse signals provided that the greater the number of pulse signals present in the information the smaller the magnitude of the numerical indicator.

Other objects, features and advantages of the invention will be evident from the following detailed description when read in connection with the accompanying drawings wherein.

Figure 1:
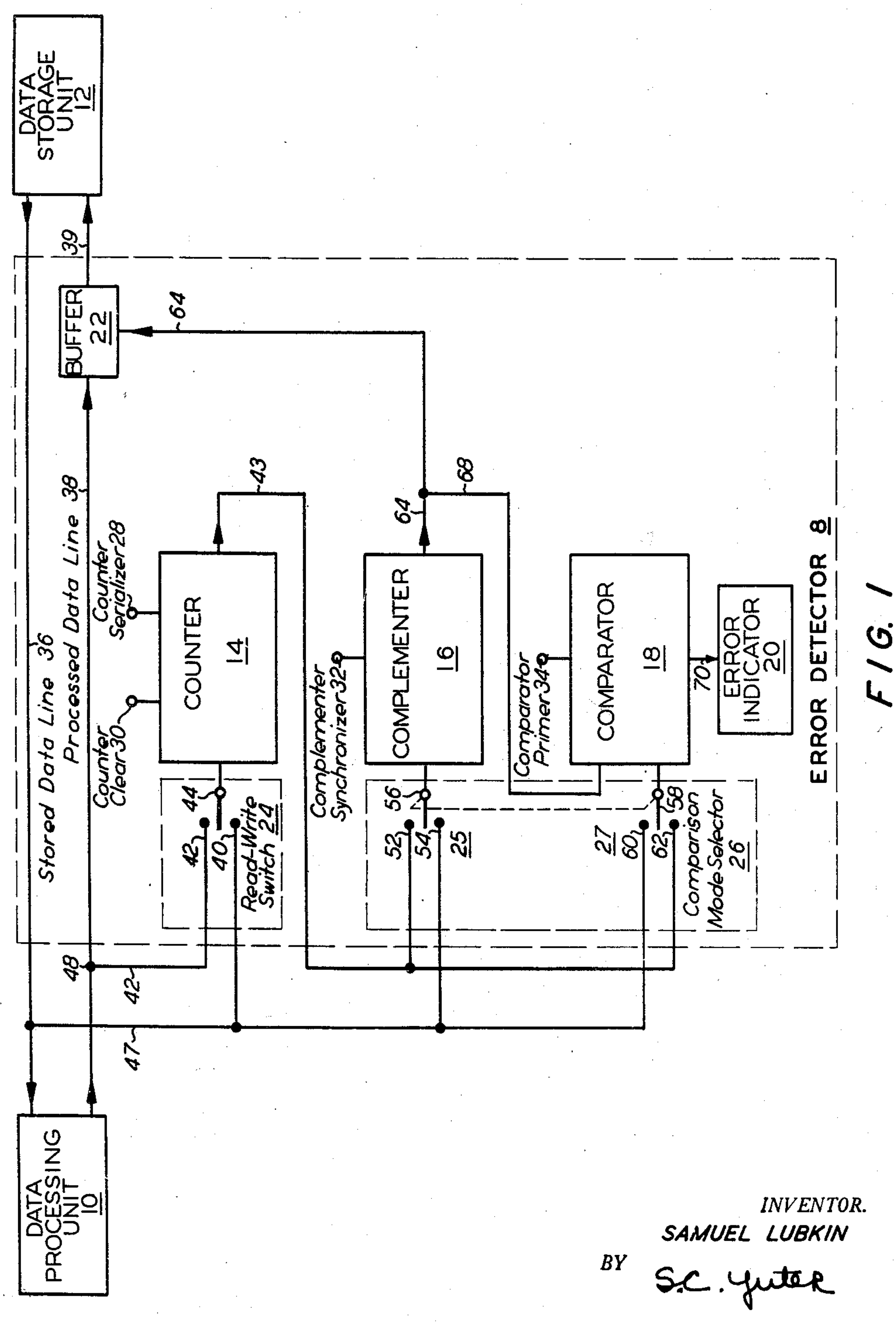
Fig. 1 is a block diagram of the error detection apparatus of the invention showing apparatus for supervising the transfer of information between a processing unit and a storage unit of a data processor.

The invention is based on a mathematical theory which is presented to furnish a complete understanding of the functioning of the apparatus of the invention. As a basis for description the binary number system will be employed but any number system is equally applicable.

The operation of counting a group of items generally consists in assigning to each item a number obtained from a monotonically increasing series of numbers. By a monotonically increasing series of numbers is meant a series of numbers in which each preceding term of the series is greater than the preceding term. Two of the more familiar series are based on the radix ten and the radix two. A radix is the integer of whose successive powers of the digits of a number are the coefficients. The radix ten system is commonly known as the decimal system and the radix two system as the binary system. The first ten terms of each and their relationship to each other are shown in Table I.

Each binary number is an abbreviated version of:

$$A_3(8)+A_2(4)+A_1(2)+A_0(1)$$

where the A's are either one or zero. For example, the decimal number seven $$7=0(8)+1(4)+1(2)+1(1)=0111$$

in binary number form. The 8, 4, 2 and 1 correspond respectively to $2^3$, $2^2$, $2^1$ and $2^0$.

*Table I*

| Decimal: | Binary |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |

A monotonically or continuously decreasing series of numbers is derivable from the monotonically increasing series of numbers, the more common series being obtained by forming the complements of the numbers of the monotonically increasing series.

The true complement and the radix minus one complement are two of the more familiar complements, and are determined by the following rules:

(*a*) *True complement.*—Subtract each digit from the radix less one, then add one to the least significant digit, executing any carries required.

(*b*) (*Radix minus one*)'*s complement.*—Subtract each digit from the radix less one.

In the decimal system when the radix is ten the true complement is often called the ten's complement and the radix minus one complement the nine's complement. In the binary system when the radix is two the true complement is usually called the two's complement and the radix minus one complement the one's complement.

In Table II are shown both complements for the decimal and binary numbers shown in Table I.

*Table II*

| Decimal Number | Ten's Complement | Nine's Complement | Binary Number | Two's Complement | One's Complement |
|---|---|---|---|---|---|
| 0 | 10 | 09 | 0000 | 10000 | 1111 |
| 1 | 09 | 08 | 0001 | 1111 | 1110 |
| 2 | 08 | 07 | 0010 | 1110 | 1101 |
| 3 | 07 | 06 | 0011 | 1101 | 1100 |
| 4 | 06 | 05 | 0100 | 1100 | 1011 |
| 5 | 05 | 04 | 0101 | 1011 | 1010 |
| 6 | 04 | 03 | 0110 | 1010 | 1001 |
| 7 | 03 | 02 | 0111 | 1001 | 1000 |
| 8 | 02 | 01 | 1000 | 1000 | 0111 |
| 9 | 01 | 00 | 1001 | 0111 | 0110 |
| 10 | 90 | 89 | 1010 | 0110 | 0101 |
| 11 | 89 | 88 | 1011 | 0101 | 0100 |
| 12 | 88 | 87 | 1100 | 0100 | 0011 |

By referring in particular to the binary numbers representing the complements in Table II a very useful property is noted. It is seen that if in any one of the complements a one is replaced by a zero the new representation so formed is the complement of a number having a greater magnitude than the number represented by the original complement. For example, 0110 represents the one's complement of the number nine (1001). When the less significant one is changed to a zero the representation 0100 is obtained which is the one's complement of the number eleven.

Since in data processors employing pulse signals the presence of a pulse signal usually represents a one and the absence of a pulse signal usualy represents a zero, the loss of a pulse signal is the same as changing a one to a zero. Hence, whenever the complement of a number loses a pulse signal the pulse-signal pattern represents the complement of a number having a greater magnitude than the originally complemented number.

This property is employed in accordance with the invention to minimize self-compensating errors during the detecting for the loss of pulse signals in the transfer of information to and from a storage unit.

The following examples summarize the mathematical properties employed in the invention. It will be assumed that a maximum of eight pulse signals will be present in any group of pulse signals (block of information) although in practice larger groups are handled. The examples will employ the binary number system, but it should be understood that other number systems are equally useful.

(1) There are five pulse signals present in the information. The one's complement of five (0101) is stored as 1010. It will be assumed no pulse signals are lost in the transfer of the information or in the storage of the one's complement. If no pulse signals are lost in the transfer to and from the storage unit then five pulse signals are counted during the transfer from the storage unit. The one's complement of five is 1010 which is the same as the one's complement of the initial count (1010).

(2) There are five pulse signals present in the information and two pulse signals are lost during the transfer to and from the storage unit. The one's complement of five (1010) is stored indicating the number of pulse signals present in the information transferred to the storage unit. Three pulse signals are present in the information transferred from the storage unit (it had been assumed two pulse signals were lost). The one's complement of three (0011) is 1100. When there is a comparison with the one's complement of the original count 1010 an inequality is shown to exist indicating an error.

(3) Five pulse signals are assumed present in the information transferred to the storage unit two of which are assumed lost, and one of the pulse signals representing the one's complement of the number of pulse signals present in the information is also assumed lost. The one's complement of five is 1010, but actually 1000 is stored (it is assumed that the pulse signal representing the second least significant digit of the one's complement is lost in storage). Three pulse signals are counted during the transfer of the information from the storage unit. The one's complement of three (1100) when compared to the erroneous one's complement that had been stored (1000) indicates an inqeuality.

Although the examples have been given using the one's complement the two's complement is equally applicable.

As has been shown the test for the relationship between the two counts has been the equality comparison between the one's complement of the number of information signals to be transferred to the storage unit and the one's complement of the number of information signals to be transferred from the storage unit.

The test for the relationship between the two counts can also, in accordance with the invention, be an equality comparison between the one's complement of the one's complement of the number of pulse signals transferred to the storage unit (that is, the stored count number is recomplemented) and the number representing the number of pulse signals transferred from the storage unit.

Another relationship that may be employed in comparing is that the binary sum of the one's complement of the number of pulse signals transferred to the storage unit and the number representing the count of the pulse signals transferred from the storage unit should be a number containing all ones. For example: The one's complement of 1010 is 0101 and the sum of the number and its one's complement is $$\begin{array}{r} 1010 \\ 0101 \\ \hline 1111 \end{array}$$

Referring to the error detection apparatus illustrated in Fig. 1, the error detector 8 is shown for checking the transfer of information between the data processing unit 10 and the data storage unit 12.

The error detector 8 comprises: the counter 14 having the counter serializer terminal 28 and the counter clear terminal 30; the complementer 16 having the complementer synchronizer terminal 32; the comparator 18 having the comparator primer terminal 34; the error indicator 20; the buffer 22; the read-write switch 24; and the comparison mode selector 26.

The output terminal of the data processing unit 10 is coupled to an input terminal of the buffer 22. The output terminal of the buffer 22 is connected via the line 39 to the input terminal of the data storage unit 12. The output terminal of the data storage unit 12 is coupled via the stored data line 36 to the input terminal of data processing unit 10. The stored data line 36 and the processed data line 38 perform as data transfer paths between the data processing unit 10 and the data storage unit 12. In a working embodiment of the invention, the data storage unit 12 is a magnetic tape storage device.

The first input terminal 40 of the read-write switch 24 is connected to the stored data line 36 via the line 47. The second input terminal 42 of the read-write switch 24 is linked to the processed data line 38 at the junction 48. The output terminal 44 of the read-write switch 24 is connected to the input terminal of the counter 14. The read-write switch 24 serves to selectively couple the data lines to the input terminal of the counter 14.

The counter serializer terminal 28 and the counter clear terminal 30 receive control and synchronization signals from the data processing unit 10 via connecting lines (not shown). The output terminal of the counter 14 is coupled by the line 43 to the first input terminal 52 of the comparison mode selector 26.

The comparison mode selector 26 comprises the pair of ganged single-pole double-throw switches 25 and 27 wherein the input terminals of the mode selector 26 are the fixed contacts of the switches and the output terminals of the switches are the moving contacts of the switches. The second input terminal 54 (the second fixed contact of the switch 25) is coupled via the line 47 to the stored data line 36. The first output terminal 56 (the moving contact of the switch 25) is connected to the input terminal of the complementer 16.

The complementer synchronizer terminal 32 receives synchronization signals from the data processing unit 10 via a line (not shown). The output terminal of the complementer 16 is linked by the line 64 to an input terminal of the buffer 22.

The output terminal of the complementer 16 is also coupled via the line 64, and the line 68 to a first input terminal of the comparator 18.

The second input terminal of the comparator 18 is coupled to the second output terminal 58 (the moving contact of the switch 27) of the comparison mode selector 26. The third input terminal 60 of the comparison mode selector 26 (the first fixed contact of the switch 27) is connected to the stored data line 36 via the line 47. The fourth input terminal 62 (the second fixed contact of the switch 27) is connected to the output terminal of the counter 14 by the line 43.

The comparator primer terminal 34 receives synchronizing signals from the data processing unit 10 via a line (not shown). The output terminal of the comparator 18 is connected to the error indicator 20 by the line 70.

The counter 14, to be more fully described later, counts pulse signals received by its input terminal and transmits the binary number represented by a serial distribution of pulse signals from its output terminal.

The complementer 16 transmits from its output terminal the one's complement of binary numbers received at its input terminal. The complementer 16 will be more fully described below.

The comparator 18 tests for the equality of the numbers represented by pulse signals received at its input terminals and transmits a signal to the error indicator 20 when an inequality exists. The comparator 18 is more fully described below.

It should be noted that although the read-write switch 24 is shown as a manual toggle switch for the purposes of illustration, in high-speed data processing operations automatic electronic switching would be employed.

The operation of the apparatus of the invention will now be described with reference to the block symbols of Fig. 1. Prior to the transfer of information to the data storage unit 12, a signal is fed from the data processing unit 10 to the counter clear terminal 30 of the counter 14 clearing the counter 14 to zero. The read-write switch 24 is switched to the write position thus connecting the terminal 42 to the terminal 44. The comparison mode selector 26 is also switched to the up position and the terminals 52 and 56 are connected together.

The information as pulse signals is fed from the data processing unit 10 via the processed data line 38, the buffer 22 and the line 39 to the data storage unit 12. Each of the pulse signals is also fed via the line 42 through the read-write switch 24 to the input terminal of the counter 14. The pulse signals are counted in the counter 14. At the termination of the transfer a signal from the data processing unit 10 is fed to the counter serializer terminal 28, and the binary number is fed from the output terminal of the counter 14 to the input terminal of the complementer 16 via the line 43 and the terminals 52 and 56. At the same time a signal is fed to the complementer synchronizer terminal 32 from the data processing unit 10 and the complemented number is transferred to the storage unit 12 via the line 64, the buffer 22 and the line 39. The transferred information and the complement of the count of the pulse signals present in the information are stored by the data storage unit 12 until the information is called for by the data processing unit 10.

Just previous to the start of the transfer of the information from the data storage unit 12, the read-write switch 24 is switched to the read position (the input terminal 44 is connected to the input terminal 40). At the same time, the counter 14 is cleared by a signal present on the counter clear terminal 30.

It will be recalled that two types of equality comparisons were discussed namely: (*a*) the comparison of the complement of the count of the number of pulse signals transferred to the data storage unit 12 with the complement of the count of the number of signals transferred from the data storage unit 12; and (*b*) the comparison of the complement of the complement of the count of the number of pulse signals transferred to the data storage unit 12 with the count of the number of signals transferred from the data storage unit 12; in practice either equality comparison may be used. For the purposes of illustration both comparisons are incorporated in the apparatus with a simple switching arrangement permitting an easy selection of the type of comparison desired. However, in an actual working embodiment only one type need be employed.

The comparison mode selector 26 determines the type of comparison to be performed. In the preferred embodiment of the invention the comparison mode selector 26 is in the up position thus connecting the first input terminal 52 to the first output terminal 56 and shorting the third input terminal 60 to the second output terminal 58. With the comparison mode selector 26 in this position the equality comparison of the two complements is performed.

As the information is transferred from the data storage unit 12 via the stored data line 36 to the data processing unit 10, the pulse signals are also fed via the line 47 and the terminals 40 and 44 to the input terminal of the counter 14.

After the transfer of the last bit of information to the data processing unit 10, the pulse signal pattern representing the complement of the original count is present on the stored data line 36. These pulse signals are fed to an input terminal of the comparator 18 via the line 47, the third input terminal 60, and the second output terminal of the comparison mode selector 26.

At the same time signals from the data processing unit 10 are fed to the counter serializer terminal 28, the complemeter synchronizer terminal 32 and the comparator primer terminal 34. The number of the second count as represented by pulse signals is fed from the output terminal of the counter 14 to the input terminal of the complementer 16 for complementing in the usual manner. The complemented number is fed via the line 64, and the line 68 to a second input terminal of the comparator 18. The comparator 18 tests for an equality of the pulse signal patterns. If the identity does not exist then an error has occurred and a signal is fed from the output terminal of the comparator 18 via the line 70 to the input terminal of the error indicator 20 to indicate an error.

When the comparison mode selector 26 is in the down position, the comparison of the complement of the complement of number indicating the count of the pulse signals transferred to the data storage unit 12 with the count of the pulse signals transferred from the data storage unit 12 can be made.

For this comparison, the number representing the count of the pulse signals transferred from the data storage unit 12 is transferred from the counter 14 via the line 43 to the fourth input terminal 62 and the second output terminal of the comparison mode selector 26 to an input terminal of the comparator 18. As this count number is being transferred, the pulse signal representation of the complement of the number of pulse signals transferred to the data storage unit 12 is present on the stored data line 36. This pulse signal pattern is fed to a second input of the comparator 18 via the line 47, the second input terminal 54 and the first output terminal of the comparison mode selector 26, through the complementer, 16 for complementing the line 64, and the line 68. The comparator 18 operating in the usual manner performs an equality comparison and activates the error indicator 20 via the line 70 when an inequality exists.

Thus in accordance with the invention an improved error-detection system has been provided for detecting errors occurring due to the loss of pulse signals in the transfer of information to a storage unit.

The error-detection system while employing pulse-signal counting techniques cannot generate compensating errors occurring from the loss of pulse signals. The count number of the pulse signals transferred may be conveniently stored in the storage unit.

Figure 2:
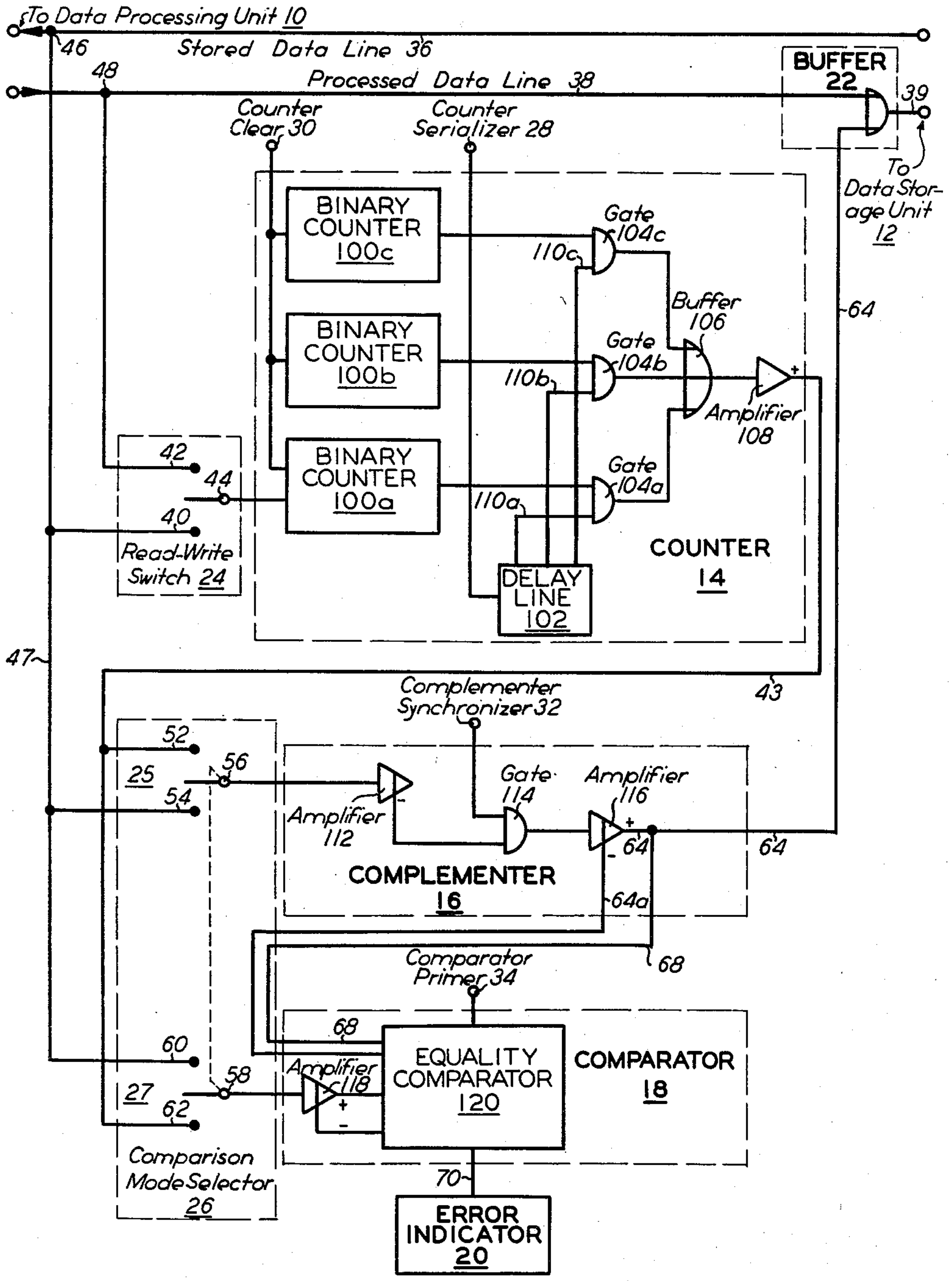
Fig. 2 shows in detail the error detection apparatus shown in the block diagram of Fig. 1.

Fig. 2 shows the error detection apparatus of Fig. 1 in greater detail.

The counter 14 is shown to comprise the binary-counter stages 100, the delay line 102, the sample gates 104, the buffer 106 and the pulse amplifier 108. The binary-counter stages can be any of the numerous flip flop circuits of the Eccles-Jordan type which change state whenever a pulse signal is fed to the associated input terminal. The delay line 102 can be a lumped-parameter or distributed-parameter type line. The delay line 102 transmits a pulse from its output terminal a predetermined period of time after the pulse is received at its input terminal. The delay line 102 has several "taps" (intermediate output terminals) which permit the transmission of a received pulse signal after different time periods of delay. The sample gates 104 are of the coincidence type which pass the least positive signal present at their respective input terminals. The buffer 106, often called an "or" gate, passes the most positive signal present at its input terminal. The gates and buffer may employ diode network techniques. The pulse amplifier 108 is an electronic network which generates a positive and negative pulse signal for each pulse signal received at its input terminal. A more detailed description of the components may be found in the National Bureau of Standards Circular 551 entitled "Computer Development (SEAC and DYSEAC) at the National Bureau of Standards, Washington, D. C." issued January 25, 1955; and more particularly, article 4 ("Circuits and symbols") of chapter 1.

During the transfer of information, the counter 14 receives pulse signals from the terminal 44. Each pulse signal causes the states of the binary counters to change in the usual manner. The output terminal of each binary counter 100 is coupled to an input terminal of an associated sample gate 104 and the voltages present at those terminations will either be positive or negative. At the end of the information transfer the binary counters have a combination of static voltages at their output terminals which indicates the count of the pulse signals.

A pulse signal from the data processing unit 10 is fed to the counter serializer terminal 28 and along the delay line 102 whose output terminals 110 are respectively coupled to the second input terminals of the gates 104. The pulse signal is serially fed to each one of the gates 104. The gates 104 pass a pulse signal whenever a positive voltage is present at the input terminal coupled to the output terminal of a binary counter. The pulse signals are fed via the buffer 106 to the pulse amplifier 108 for amplification and shaping. In this manner the static voltages present on the output terminals of the binary counters are synchronously changed to a serial pattern of pulse signals which represent the count.

The complementer 16 comprises the pulse amplifier 112, the gate 114 and the pulse amplifier 116 which are similar to the above-described components. The input terminal of the pulse amplifier 112 is connected to the first output terminal 56 of the comparison mode selector 26. The negative output terminal of the pulse amplifier 112 is coupled to an inhibiting input terminal of the gate 114. The second input terminal of the gate 114 is the complementer synchronizer terminal 32. The output terminal of the gate 114 is connected to the input terminal of the pulse amplifier 116. The positive output terminal of the pulse amplifier 116 is coupled to the line 64 and the negative output terminal is coupled to the line 64*a*.

The complementer 16 is a one's complementer which functions as follows: As the pulse signal pattern representing the number to be complemented is fed to the input terminal of the pulse amplifier 112 a series of equally-spaced pulse signals is synchronously fed to the gate 114 via complementer synchronizer terminal 32. Since the negative output terminal of the pulse amplifier 112 is coupled to the inhibiting input terminal of the gate 114, the presence of a pulse signal at the input terminal of the pulse amplifier 112 causes the transmission of a negative pulse signal to the inhibiting input terminal of the gate 114 blocking the transmission of the pulse signal present at the complementer synchronizer terminal 32. The absence of a pulse signal at the input terminal of the pulse amplifier 112 causes the negative output terminal of the pulse amplifier 112 to be at a positive potential; therefore the inhibiting input terminal of the gate 114 is nonoperative and a pulse signal is transmitted by the gate 114 to the input terminal of the pulse amplifier 116 for amplification and transmission to the line 64. Thus the presence of a pulse signal at the input terminal of the complementer 16 results in no pulse signal being present at the output terminal of the complementer 16, and the absence of a pulse signal at the input terminal of the complementer 16 results in a pulse signal being present at the output terminal of the complementer 16. It should be noted that since the presence of a pulse signal indicates a binary one and the absence of a pulse signal indicates a binary zero, the complementer 16 functions to change all the binary ones in a number to zeros and all the binary zeros to ones. The operation is equivalent to performing the one's complement on a binary number.

The comparator 18 comprises the pulse amplifier 118 and the equality comparator 120. The equality comparator 120 may be similar to the fundamental element (7) shown in Fig. 4.2 on page 76 and described in Table III on page 90 of the above-cited National Bureau of Standards Circular 551. The signal T in the reference is a signal from the data processing unit 10 which is fed to the comparator primer terminal 34 of the comparator 18. The pulse signals representing the two numbers to be compared may be the A and B signals and their negative counterparts as shown in the reference.

In another embodiment the comparator 18 may be a full binary adder which adds the stored complemented number and the second count number. If no pulse signals have been lost the sum should contain all binary ones.

The error indicator 20 may be any conventional alarm circuit, for example a control flip flop which is originally set and remains set until a signal from the comparator 18 resets it.

It is also possible to actually check portions of the error-detection apparatus by using equality comparators and taking advantage of the inherent numerical properties of the system. If information or numerical indicator pulse signals are lost then the comparator will show a particular inequality; that is, one of the numerical indicators will be greater than the other numerical indicator. If the opposite inequality occurs it can only be due to malfunctioning of the error-detection apparatus. Thus by sensing not only for an inequality but also for the kind of inequality a much more reliable error-detection system is provided.

It should be noted that for the examples given it has been assumed that the maximum number of pulse signals present in any transfer is eight pulse signals and thus only three binary counters 100 are shown. When the count is known to be larger more binary counters may be employed. For example, in one application when magnetic tapes are the storage unit the information being transferred may have as many as two thousand pulse signals present thus requiring eleven binary-counter stages. An alternative is to use fewer binary-counter stages and count a smaller number. The check will be less strict but may be adequate in some applications.

In the above embodiments the count numbers have been the actual number of pulse signals present in the information. By assigning different values to each pulse signal present in the information the so-called weighted counts may be obtained. The weighted count as a count number may then be converted to a numerical indicator for storage. In this way not only is it possible to check for loss of pulse signals but also for a shift in the significance of the pulse signals.

While only two representative embodiments of the invention disclosed herein have been outlined in detail, there will be obvious to those skilled in the art, many modifications and variations accomplishing the foregoing objects and realizing many or all of the advantages, but which do not depart essentially from the spirit of the invention.

What is claimed is:

1. In a system for transferring information as signals to and from a storage unit, means responsive to the signals transferred to said storage unit for forming a first number related to the quantity of signals transferred to said storage unit, means for converting said first number to a first numerical indicator such that when said first number has a first value said numerical indicator has a first value and when said first number has any value greater than its first value said numerical indicator has a value less than its value, means to apply certain of said information signals transferred from said storage unit to said responsive means for generating a second numerical indicator related to the signals transferred from said storage unit, and sensing means for sensing the presence of a predetermined relationship between said first and said second numerical indicators.

2. In a system for transferring information as signals between a processing unit and a storage unit, error detection apparatus comprising counting means responsive to the signals transferred to said storage unit for generating a count number related to the number of signals transferred to said storage unit, complementing means for complementing said count number, and transferring said complemented count number to said storage unit, a switch to connect said counting means and said complementing means to said storage unit for generating a numerical indicator related to the number of signals transferred from said storage unit, and comparing means for comparing said complemented count number from said storage unit and said numerical indicator to detect a predetermined relationship.

3. In a system for transferring information as signals between a processing unit and a storage unit, counting means responsive to signals transferred to said storage unit for generating a series of count numbers, the last generated count number representing the number of information signals transferred to said storage unit, converting means for converting the last generated count number to a numerical indicator, said numerical indicator being from a monotonically decreasing series of numbers derived from the count numbers, means for transferring said numerical indicator, to said storage unit after the transfer of the information switching means for applying signals transferred from said storage unit to said counting means for generating a second series of count numbers, the last generated count number of said second series indicating the number of signals transferred from said storage unit, and sensing means for sensing the presence of a predetermined relationship between said numerical indicator and said second count number.

4. In a system for transferring information represented by signals to and from a storage unit, error detection apparatus comprising means responsive to the signals transferred to said storage unit for generating a first count number related to the number of signals transferred to said storage unit, means for complementing said first count number to a complemented first count number, means such for transferring said complemented first count number to said storage unit, settable means to transfer the information signals transferred from said storage unit to said responsive means for generating a second count number, said second complementing means complementing said second count number to a complemented second count number, and means for sensing a predetermined relationship between said complemented first count number and said complemented second count number to detect the occurrence of an error.

5. In a system for transferring information represented by signals to and from a storage unit, error detection apparatus comprising counting means responsive to the signals transferred to said storage unit for generating a first count number related to the number of signals transferred to said storage unit, complementing means for complementing said first count number, said counting means being delayedly responsive to the information signals transferred from said storage unit for generating a second count number, said complementing means complementing said second count number, and means for comparing said complemented first count number with said complemented second count number to detect the occurrence of an error.

6. In a system for transferring information represented by signals to and from a storage unit, error detection apparatus comprising counting means responsive to the signals transferred to said storage unit for generating a first count number related to the number of signals transferred to said storage unit, complementing means for complementing said first count number, means for transferring said complemented first count number to said storage unit, said counting means being responsive by switching means to the information signals transferred from said storage unit for generating a second count number, said complementing means complementing said second count number, and means for sensing a predetermined relationship between said complemented first count number when transferred from said storage unit and said complemented second count number to detect the occurrence of errors resulting in the loss of stored signals.

7. In a system for transferring information represented by signals to and from a storage unit, error detection apparatus comprising counting means responsive to the signals transferred to said storage unit for generating a first count number representing the number of signals transferred to said storage unit, complementing means for complementing said first count number, means for transferring said complemented first count number to said storage unit following the transfer of the information, said counting means also being responsive by switching means to the information signals transferred from said storage unit for generating a second count number representing the number of information signals transferred from said storage unit, said complementing means complementing said second count number, and comparing means for sensing an inequality between said complemented first count number when transferred from said storage unit after the transfer of information signals and said complemented second count number to detect the occurrence of an error resulting from the loss of information signals in said storage unit.

8. Apparatus for detecting errors in the transfer of information signals to and from an information storage unit comprising counting means for counting the number of information signals transferred to said storage unit and for counting the number of information signals transferred from said storage unit, complementing means for complementing the number representing the number of signals transferred to said storage unit, means for transferring said complemented number to said storage unit, and comparing means including said complementing means for comparing the stored complemented number with the complement of the number representing the number of signals transferred from said storage unit.

9. Error detecting apparatus for detecting an error in the transfer of information represented by pulse signals between a processing unit and a storage unit of a data processor comprising counting means for counting the number of information pulse signals transferred from said processing unit to said storage unit, complementing means controllably responsive to said counting means for complementing the number representing the count of the pulse signals transferred from said processing unit to said storage unit, transfer means for transferring the complemented number as pulse signals to said storage unit for storage with the transferred information pulse signals, said complementing means being controllably responsive to said counting means during the transfer of information pulse signals from said storage unit to said processing unit for determining a first number, said stored complemented number being a second number, comparing means controllably receiving signals representing numbers from said storage unit and said complementing means during the transfer of signals from said storage unit to said processing unit, said comparing means sensing for an inequality between said first and second numbers, and an error indicator responsive to said comparing means for indicating an error when an inequality occurs.

10. In a system for transferring information represented by signals to and from a storage unit, error detection apparatus comprising counting means responsive to the signals transferred to said storage unit for generating a first count number related to the number of signals transferred to said storage unit, complementing means for complementing said first count number, said counting means being responsive to the information signals transferred from said storage unit for generating a second count number, said complementing means complementing said complemented first count number, and means for comparing said recomplemented first count number with said second count number to detect the occurrence of an error.

11. In a system for transferring information represented by signals to and from a storage unit, error detection apparatus comprising counting means responsive to the signals transferred to said storage unit for generating a first count number related to the number of signals transferred to said storage unit, complementing means for complementing said first count number, means for transferring said complemented first count number to said storage unit following the transfer of information to said storage unit, said counting means being responsive to the information signals returned from said storage unit for generating a second count number, said complementing means complementing said complemented first count number which is transferred after the transfer of the information from said storage unit, and means for sensing a predetermined relationship between said recomplemented first count number and said second count number to detect the occurrence of an error.

12. Apparatus for detecting errors in the transfer of information signals to and from an information storage unit comprising counting means for counting the number of information signals transferred to said storage unit and for counting the number of information signals transferred from said storage unit, complementing means for complementing the number representing the number of signals transferred to said storage unit, means for transferring said complemented number to said storage unit, and comparing means including said complementing means for comparing the complement of the stored complemented number with the number representing the number of signals transferred from said storage unit.

13. Error detecting apparatus for detecting an error in the transfer of information represented by pulse signals between the processing unit and the storage unit of a data processor comprising counting means for counting the number of information pulse signals transferred from said processing unit to said storage unit, complementing means responsive to said counting means for complementing the number representing the count of the pulse signals transferred from said processing unit to said storage unit, transfer means for transferring the complemented number as pulse signals to said storage unit for storage with the transferred information pulse signals, comparing means responsive to said counting means and said complementing means during the transfer of pulse signals from said storage unit to said processing unit, said counting means also counting the number of information pulse signals transferred from said storage unit to said processing unit for determining a first number, said complementing unit complementing the number representing the complement of the number of the information pulse signals transferred from said processing unit to said storage unit for determining a second number, said comparing means sensing for an inequality between said first and second numbers, and an indicating means being responsive to said comparing means for indicating the existence of an error when an inequality occurs between said first and second numbers.

References Cited in the file of this patent

UNITED STATES PATENTS

| | | |
|---|---|---|
| Re. 23,601 | Hamming et al. | Dec. 23, 1952 |
| 2,512,038 | Potts | June 20, 1950 |
| 2,640,872 | Hartley et al. | June 2, 1953 |